United States Patent
Lokkinen

(10) Patent No.: US 10,646,904 B2
(45) Date of Patent: May 12, 2020

(54) CLEANING DEVICE, METHOD AND USE FOR CLEANING A PIPE

(71) Applicant: Innotia Eesti Oü, Tallinn (EE)

(72) Inventor: Mika Lokkinen, Porvoo (FI)

(73) Assignee: Picote Solutions Inc., Sammamish, WA (US)

(*) Notice: Subject to any disclaimer, the term of this patent is extended or adjusted under 35 U.S.C. 154(b) by 226 days.

(21) Appl. No.: 15/800,123

(22) Filed: Nov. 1, 2017

(65) Prior Publication Data

US 2018/0126430 A1 May 10, 2018

(51) Int. Cl.
| | |
|---|---|
| B08B 9/043 | (2006.01) |
| B08B 9/045 | (2006.01) |
| B21L 11/14 | (2006.01) |
| E03F 9/00 | (2006.01) |
| B60C 27/08 | (2006.01) |
| B60C 27/00 | (2006.01) |
| B60C 27/02 | (2006.01) |
| F16G 13/18 | (2006.01) |
| F16G 15/14 | (2006.01) |

(52) U.S. Cl.
CPC ............ *B08B 9/0436* (2013.01); *B08B 9/045* (2013.01); *B21L 11/14* (2013.01); *B60C 27/00* (2013.01); *B60C 27/0223* (2013.01); *B60C 27/086* (2013.01); *E03F 9/002* (2013.01); *F16G 13/18* (2013.01); *F16G 15/14* (2013.01)

(58) Field of Classification Search
CPC ....... B08B 9/0436; B08B 9/045; B21L 11/14; E03F 9/002; F16G 13/18; F16G 15/14
See application file for complete search history.

(56) References Cited

U.S. PATENT DOCUMENTS

| | | | | | |
|---|---|---|---|---|---|
| 1,912,137 | A | * | 5/1933 | Hodell | B08B 9/0436 15/104.2 |
| 4,771,500 | A | * | 9/1988 | Kovacs | B08B 9/045 15/104.33 |
| 5,293,916 | A | * | 3/1994 | Kucherry, Sr. | A01G 23/097 144/208.7 |
| 2016/0121377 | A1 | | 5/2016 | Virtanen | |
| 2018/0222079 | A1 | * | 8/2018 | McCauley | A01G 23/095 |

FOREIGN PATENT DOCUMENTS

| | | |
|---|---|---|
| DE | 202101003125 | 6/2010 |
| EP | 2199117 | 6/2010 |
| GB | 362614 | 12/1931 |

OTHER PUBLICATIONS

Renssi, "Putkirenssit", (Jan. 27, 2017), http://web.archive.org/web/20130427171414/http://www.renssi.fi/index.php?route=product/category&path=59.

* cited by examiner

*Primary Examiner* — Randall E Chin
(74) *Attorney, Agent, or Firm* — Fasth Law Offices; Rolf Fasth

(57) ABSTRACT

The cleaning device is for cleaning the inner surface of pipes. The method is for manufacturing the cleaning device and the use is of a vehicle anti-skid chain for cleaning the inner surface of a pipe. The cleaning device has a sleeve, to which are attached studded chains composed of steel links and surface hardened.

4 Claims, 2 Drawing Sheets

CLEANING DEVICE, METHOD AND USE FOR CLEANING A PIPE

PRIOR APPLICATION

This is a U.S. patent application that claims priority from Finnish Patent Application No. 20165834, filed 8 Nov. 2016.

FIELD OF THE INVENTION

The invention relates to a device, method and use for cleaning a pipe from the inside of the pipe.

PRIOR ART

For cleaning the inside of pipes, such as, for example, sewage pipes that have been in use, many kinds of tools have been developed. At the present, a tool according to prior art consists of two end sleeves and steel chains connecting these, to the links of which are soldered sharp-edged hard metal or carbide pieces. The respective tool is used by tightening the sleeves onto a flexible shaft and rotating the flexible shaft, wherein the chains connecting the sleeves spread against the inner surface of the pipe and the carbide pieces detach dirt, rust and other undesired material from the inner surface of the pipe. The tool is rotated at rotational speeds from a few hundred to a few thousand RPM, depending i.a. on the diameter of the pipe and the desired cleaning efficiency.

A solution according to the prior art described above has been arrived at through extensive experimentation and tests. It has been observed that the chain needs to be tough in order that the chain does not break or crack under stress. To achieve cleaning efficiency and a long service life, additionally required is hardness, which is achieved by hard metal or carbide pieces, which are placed such that they come into contact with the inner surface of the pipe and the material to be cleaned, wherein the chain itself does not wear through.

One example of a cleaning chain according to prior art is the solution presented in patent application US20160121377, in which hard metal pieces are soldered to a chain.

The hard pieces should be joined to the chain such that the joint between them withstands the high forces directed onto it and such that both the toughness of the chain and the hardness of the piece are retained. Making these joints is laborious, slow and requires special solders, which are expensive.

BRIEF DESCRIPTION OF THE INVENTION

The object of the invention is a cleaning device for cleaning a pipe, a method for manufacturing the cleaning device as well as its use for cleaning a pipe. By the device, method and its use, cleaning devices suitable for cleaning a pipe can be manufactured faster and less expensively.

The invention is based on the use of the anti-skid chains for cleaning a pipe, the chains being used around the tyres of work vehicles when driving on snowy and icy surfaces. To the links of the anti-skid chain are attached, for example, by melting or welding, studs, which can be of the same material as the chain itself. The respective chains are shaped such that they settle evenly against the surface of a tyre, the studs pointing directly outwards from the surface of the tyre and thus the purpose of the anti-skid chains is to increase friction between the vehicle tyre and the driving surface. When testing a cleaning device manufactured from the respective anti-skid chains, it was observed that, contrary to the teachings of prior art, the use of hard metal pieces is unnecessary, if the studded chains manufactured from iron or steel are surface hardened, for example, by carbonizing, which affords a high surface hardness, but maintains the toughness of the metal in the inner parts.

BRIEF DESCRIPTION OF THE FIGURES

The invention is now described in more detail in connection with preferred embodiments with reference to the accompanying drawings, in which.

DETAILED DESCRIPTION OF THE INVENTION

Figure 1:
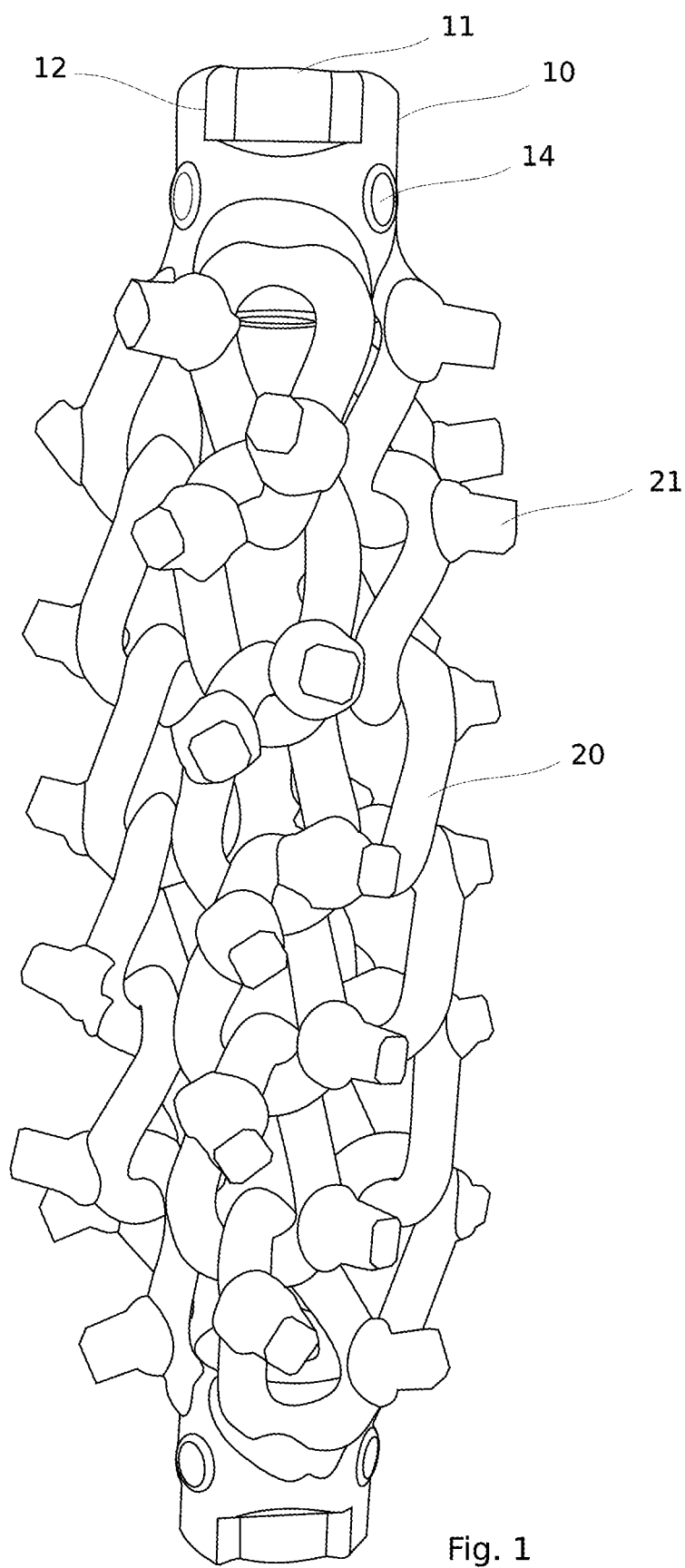
FIG. 1 shows a cleaning device according to one embodiment.

FIG. 1 shows a cleaning device according to one embodiment, which is composed of two sleeves 10 and, connecting these, three chains, which are attached to the sleeves, for example, by welding. In the embodiment of FIG. 1, each of the three chains has six links 20, each link having two studs 21. Between the ends, the sleeves 10 have in the middle a round opening, which extends through the sleeve. The sleeve has two or more threaded holes 14, which extend from the outer surface of the sleeve 10 into the round opening in the middle of the sleeve. By means of the opening between the ends of the sleeve 10, the cleaning device can be attached to the axis of a drive, which is guided through said openings. The cleaning device is attached to the axis by screws, for example, by retainer screws, which are tightened from the threaded holes 14 against the axis of the drive. The axis is preferably flexible in order to be pushed through the corners and bends of the piping to be cleaned, but nonetheless stiff for pushing, which enables pushing of the cleaning device in the pipe even for long distances. The axis is preferably within a protective casing in the portion between the drive and the cleaning device, inside which protective casing the axis is able to rotate. As the drive can be used, for example, a drill, electric motor, pneumatic motor, hydraulic motor or a power transmission device manufactured for the purpose, which comprises a flexible axis and a motor that rotates it.

Figure 2:
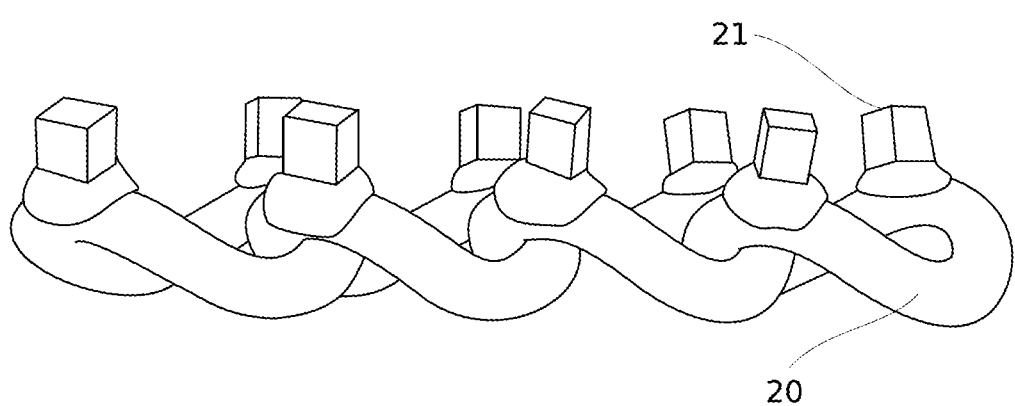
FIG. 2 shows a suitable type of chain.

An embodiment according to FIG. 1 uses preferably a chain according to FIG. 2. FIG. 2 shows a chain composed of four links 20, each link of which has two studs 21. The studs 21 are attached to the links 20, for example, by welding or by melting with electric current and pressing the stud and chain against each other, until a joint is formed. The links 20 of the chain are twisted such that the crosswise corners of each link are in the same plane with each other, but in a different plane than the adjacent corners. The planar difference of the adjacent corners is the thickness of a strand of the chain or greater in size, wherein the successive links as placed into the plane are to be placed in the same position. In this case, the studs 21 are attached to those crosswise corners of the chain, which are outermost from the plane, wherein the studs protrude from the chain and from the plane as much as possible and the stud pairs are in each link on the same side and parallel with each other, when the chain is placed into a plane, for example, against the plane. The studs can be round or angular bars, for example, quadrangular, pentagonal, hexagonal or octagonal bars. The end of a stud is preferably cut straight, wherein, in a stud attached to a link, one straight-cut end of the bar is attached to the link and the opposite end of the bar remains open, wherein the straight angles between the open end of the bar and the sides of the bar function as the shear surfaces of the stud, which detach and/or break apart material from the inside of the pipe as the cleaning device rotates. The respective material to be detached and/or broken apart can be, for example, tree roots, rust, fat, dirt or substance intended for coating the inside of the pipe, which it is desired to remove from the pipe either to improve the flow capacity of the pipe and/or before other measures to be performed on the pipe.

In one embodiment, the chains presented in EP2199117 can be used. As the material of the links and studs of the chain is preferably used steel, for example, 22MnB4 steel or a corresponding grade of steel. The sleeves can be of the same material, but other grades of steel can also be used. The cleaning device or only the chains with their studs are preferably treated by surface hardening. Preferably, surface hardening is performed by carbonization, i.e. case hardening, in which the carbon content of the surface layer of the steel increases. After case hardening, as the unit is cooled, the carbonized surface layer becomes martensitic and hard, but the inside remains tough. Thus is achieved exceptionally good resistance against wear without the structure becoming fragile. In a cleaning device according to the embodiment presented in FIG. 1, two or more chains can be used between the sleeves. Preferably, there are three chains. Specifically, in a cleaning device intended for cleaning pipes that are small in diameter, it may be advantageous to use two chains. Specifically, in a cleaning device intended for cleaning pipes that are large in diameter, it may be advantageous to use four chains. Each chain has several links, preferably at least three links and up to 20 links. In a cleaning device intended for exceptionally large pipes, there can be more than 20 links in each chain. A cleaning device intended for a pipe, for example, 100 mm in diameter, can use, for example, six, seven, or eight links. In this case, the sleeves are attached to the drive axis at such a distance from each other that, as the cleaning device rotates, the outermost surfaces of the studs circle in a ring, the diameter of which is, at its greatest, slightly over 100 mm. In pipes of larger diameter can be used chains having more links, and in pipes of smaller diameter can be used chains having fewer links. Also less than whole links, such as, for example, half links, can be used at the ends of the chain as attached to the sleeve.

In one embodiment, the sleeve 10 of the cleaning chain comprises a recess 11 on the outer surface of the sleeve, preferably, in the opposite end of the sleeve in relation to the joint of the links of the chain. The recess 11 forms sharp edges 12 to the outer surface of the sleeve 10. The sharp edges 12 can help detach and/or break apart the material in the pipe, in particular in situations, in which material to be removed has collected in the pipe in such an amount that the pipe is entirely or nearly blocked. In this case, the sleeve, by means of the recess 11, detaches material to the extent that the chain part of the cleaning device fits into the opening formed by the sleeve in the material blocking the pipe, and is able, little by little, to detach and/or break apart the material down to the inner surface of the pipe.

In one embodiment, the cleaning device can use just one sleeve 10, to which the chains composed of studded 21 links 20 are attached, for example, by welding one link 20 of each chain to the sleeve, wherein the other end of each chain remains free. The length of the chain is dimensioned to be slightly longer than the radius of the pipe to be cleaned, for example, by about one link longer than the radius of the pipe to be cleaned. In one embodiment, the chains are attached from their both ends to the same sleeve, wherein the cleaning device can be implemented using one sleeve and one or two chains attached thereto. Also in these embodiments, preferably, an above-described chain according to FIG. 2 composed of links 20 and studs 21 is used.

In one embodiment, the cleaning device can use only one sleeve 10, to which is attached, for example, by welding, a round or angular plate, which is parallel with the ends of the sleeve 10 and/or perpendicular in relation to the longitudinal direction of the opening of the sleeve 10. To the edges of the plate are attached, for example, by welding, chains, which protrude radially from the plate. The chains attached to the plate can be composed of studded 21 or non-studded links 20. The chains attached to the plate are from their other ends attached to a chain, which has been made circular and which is composed of studded 21 links 20 such that the studs 21 remain as the outermost part of the cleaning device as the cleaning device rotates. In this embodiment, the length of the circular chain corresponds to about the length of the circumference of the inner surface of the pipe, wherein the circular chain can be, for example, at the most or at least as long as the circumference of the inner surface of the pipe or by less than one, less than two or less than three links longer than the circumference of the inner surface of the pipe. The outer perimeter of said plate can be, for example, at the most 60%, 50%, 40% or 30% the length of said circular chain. There can be, for example, between two and eight, preferably four chains between the plate and the circular chain. Also in these embodiments, preferably, an above-described chain according to FIG. 2 composed of links 20 and studs 21 is used. Between the plate and the circular chain can also be used other kinds of chains.

One aspect of the invention is a method for manufacturing a cleaning device. In the method, a metal sleeve is obtained, for example, by casting or by machining the sleeve from a metal bar by milling. One or more chains composed of links are obtained and said one or more chains are welded to the metal sleeve from their outermost link. The method is characterized in that said one or more chains are vehicle anti-skid chains made of steel, to the links of which are attached steel studs. Preferably, said one or more chains are surface hardened before being welded to the sleeve.

In the method, preferably, a chain composed of steel links 20 is used, each link of which has two studs 21. The studs 21 are attached to the links 20, for example, by welding or by melting with electric current and pressing the stud and chain against each other, until a joint is formed. The links 20 of the chain are twisted such that the crosswise corners of each link are in the same plane with each other, but in a different plane than the adjacent corners. The planar difference of the adjacent corners is the thickness of a strand of the chain or greater in size, wherein the successive links as placed into the plane are to be placed in the same position. In this case, the studs 21 are attached to those crosswise corners of the chain, which are outermost from the plane, wherein the studs protrude from the chain and from the plane as much as possible and the stud pairs are in each link on the same side and parallel with each other, when the chain is placed into a plane, for example, against the plane. The studs can be round or angular bars, for example, quadrangular, pentagonal, hexagonal or octagonal bars. The end of a stud is preferably cut straight, wherein, in a stud attached to a link, one straight-cut end of the bar is attached to the link and the opposite end of the bar remains open, wherein the straight angles between the open end of the bar and the sides of the bar function as the shear surfaces of the stud, which detach and/or break apart material from the inside of the pipe as the cleaning device rotates. The respective material to be detached and/or broken apart can be, for example, tree roots, rust, fat, dirt or substance intended for coating the inside of the pipe, which it is desired to remove from the pipe either to improve the flow capacity of the pipe and/or before other measures to be performed on the pipe.

One aspect of the invention is the use of a vehicle anti-skid chain to clean the inner surface of a pipe by rotating the chain. Preferably, a vehicle anti-skid chain is used, to the links of which are attached studs. Preferably, the vehicle anti-skid chain is surface hardened. The vehicle anti-skid chain can be a chain composed of steel links 20, each link of which has two studs 21. The studs 21 are attached to the links 20, for example, by welding or by melting with electric current and pressing the stud and chain against each other, until a joint is formed. The links 20 of the chain are twisted such that the crosswise corners of each link are in the same plane with each other, but in a different plane than the adjacent corners. The planar difference of the adjacent corners is the thickness of a strand of the chain or greater in size, wherein the successive links as placed into the plane are to be placed in the same position. In this case, the studs 21 are attached to those crosswise corners of the chain, which are outermost from the plane, wherein the studs protrude from the chain and from the plane as much as possible and the stud pairs are in each link on the same side and parallel with each other, when the chain is placed into a plane, for example, against the plane. The studs can be round or angular bars, for example, quadrangular, pentagonal, hexagonal or octagonal bars. The end of a stud is preferably cut straight, wherein, in a stud attached to a link, one straight-cut end of the bar is attached to the link and the opposite end of the bar remains open, wherein the straight angles between the open end of the bar and the sides of the bar function as the shear surfaces of the stud, which detach and/or break apart material from the inside of the pipe as the cleaning device rotates. The respective material to be detached and/or broken apart can be, for example, tree roots, rust, fat, dirt or substance intended for coating the inside of the pipe, which it is desired to remove from the pipe either to improve the flow capacity of the pipe and/or before other measures to be performed on the pipe.

One aspect of the invention is a method for cleaning a pipe, in which method, one or more chains are welded to a sleeve from the outermost link of the chain, the sleeve is attached to a drive axis, the sleeve and chain are placed into an object to be cleaned and the drive axis is rotated, which rotates the sleeve and the one or more chains welded thereto. Preferably, said chain is a vehicle anti-skid chain, to the links of which are attached studs. Preferably, the vehicle anti-skid chain is surface hardened. The vehicle anti-skid chain can be a chain composed of steel links 20, each link of which has two studs 21. The studs 21 are attached to the links 20, for example, by welding or by melting with electric current and pressing the stud and chain against each other, until a joint is formed. The links 20 of the chain are twisted such that the crosswise corners of each link are in the same plane with each other, but in a different plane than the adjacent corners. The planar difference of the adjacent corners is the thickness of a strand of the chain or greater in size, wherein the successive links as placed into the plane are to be placed in the same position. In this case, the studs 21 are attached to those crosswise corners of the chain, which are outermost from the plane, wherein the studs protrude from the chain and from the plane as much as possible and the stud pairs are in each link on the same side and parallel with each other, when the chain is placed into a plane, for example, against the plane. The studs can be round or angular bars, for example, quadrangular, pentagonal, hexagonal or octagonal bars. The end of a stud is preferably cut straight, wherein, in a stud attached to a link, one straight-cut end of the bar is attached to the link and the opposite end of the bar remains open, wherein the straight angles between the open end of the bar and the sides of the bar function as the shear surfaces of the stud, which detach and/or break apart material from the inside of the pipe as the cleaning device rotates. The respective material to be detached and/or broken apart can be, for example, tree roots, rust, fat, dirt or substance intended for coating the inside of the pipe, which it is desired to remove from the pipe either to improve the flow capacity of the pipe and/or before other measures to be performed on the pipe.

It is obvious to the skilled person in the art that, as technology develops, the basic idea of the invention can be implemented in various ways. The invention and its embodiments are thus not limited to only the examples presented above, rather many variations are possible within the scope of the claims.

The invention claimed is:

1. A cleaning device for cleaning the inner surface of a pipe, the device comprising:
   at least one sleeve arranged to be rotated as well as chains composed of links, which are attached to said at least one sleeve from at least one link, and to which links are attached studs, said links and studs are made of steel, which is surface hardened; and
   wherein the cleaning device comprises two sleeves as well as two chains composed of links, which chains are attached by welding to the sleeves by attaching the link at the end of each chain to one sleeve and the link at the opposite end of the chain to the other sleeve.

2. The cleaning device according to claim 1, wherein the links of said chains are twisted such that the crosswise corners of each link are in the same plane with each other, but in a different plane than the adjacent corners such that the successive links in the chain are to be placed in the same position.

3. The cleaning device according to claim 1, wherein the links comprise two studs which are attached to the crosswise corners of the links.

4. The cleaning device according to claim 1 wherein the sleeve comprises a recess on the outer surface of the sleeve, which recess forms sharp edges to the outer surface of the sleeve.

* * * * *